United States Patent [19]

Kemeny et al.

[11] Patent Number: 6,126,731
[45] Date of Patent: Oct. 3, 2000

[54] POLYMERIZABLE INK COMPOSITION

[75] Inventors: Matthias D. Kemeny, Vancouver, Wash.; Geoffrey V. F. Seaman, Pleasant Hill, Oreg.

[73] Assignee: Idea Development Company, Beaverton, Oreg.

[21] Appl. No.: 09/138,085

[22] Filed: Aug. 21, 1998

[51] Int. Cl.$^7$ .......................... C09D 11/00; C09D 11/02; C09D 11/08; C08F 2/48

[52] U.S. Cl. .................................. 106/31.6; 106/31.165; 106/31.85; 106/31.89; 522/75; 522/81; 522/83; 522/84; 523/160; 430/138; 428/402.2; 428/402.21; 428/402.22; 428/407

[58] Field of Search .............................. 523/160; 522/75, 522/81, 83, 84; 430/138; 428/402.2, 402.21, 402.22, 407; 106/31.6, 31.65, 31.85, 31.89

[56] References Cited

U.S. PATENT DOCUMENTS

| | | | |
|---|---|---|---|
| H1517 | 2/1996 | Erickson et al. | 523/400 |
| 3,956,235 | 5/1976 | Pasternack et al. | 260/45.75 |
| 3,957,694 | 5/1976 | Bolon et al. | 252/514 |
| 4,137,138 | 1/1979 | Batt et al. | 204/159.18 |
| 4,221,686 | 9/1980 | Sakiyama et al. | 260/23 |
| 4,780,487 | 10/1988 | Kurpiewski et al. | 522/93 |
| 4,945,121 | 7/1990 | Micale et al. | 523/339 |
| 5,024,700 | 6/1991 | Britton, Jr. | 106/32 |
| 5,118,590 | 6/1992 | Kakimi | 430/138 |
| 5,180,757 | 1/1993 | Lucey | 522/76 |
| 5,233,033 | 8/1993 | Lucas et al. | 526/301 |
| 5,502,310 | 3/1996 | Niestrath et al. | 250/492.1 |
| 5,516,621 | 5/1996 | Tsuda et al. | 430/138 |
| 5,523,335 | 6/1996 | Whyzmuzis et al. | 523/160 |
| 5,539,038 | 7/1996 | Katsen et al. | 524/399 |
| 5,607,999 | 3/1997 | Shimizu et al. | 524/503 |
| 5,658,964 | 8/1997 | Amon et al. | 522/31 |
| 5,698,621 | 12/1997 | Nguyen et al. | 524/297 |
| 5,821,276 | 10/1998 | Duncan | 522/20 |
| 5,830,927 | 11/1998 | Vanderhoff et al. | 522/81 |
| 5,837,754 | 11/1998 | Shimomura et al. | 523/161 |
| 5,849,815 | 12/1998 | Aoki et al. | 523/161 |
| 5,883,182 | 3/1999 | Hunt | 524/525 |

FOREIGN PATENT DOCUMENTS

| | | |
|---|---|---|
| 07196965 | 8/1995 | Japan. |
| 07258591 | 10/1995 | Japan. |

OTHER PUBLICATIONS

Chapter 4, pp. 109–183 "Raw Materials" from Printing Ink Manual, Year Unknown.
Studies on the Preparation and Characterization of Monodisperse Polystyrene Latices from Colloid & Polymer Sci. 252, 464–471 (1974).
Studies on the Preparation and Characterization of Monodisperse Polystyrene Latices from Colloid & Polymer Sci. 60, 163–175 (1976).
Uniform Latex Particles (1984).
Physicochemical Factors in Latex Rapid Agglutination Tests (Jun., 1986).
Blood Modeling Using Polystyrene Microspheres (1989).

*Primary Examiner*—James J. Seidleck
*Assistant Examiner*—Sanza L. McClendon
*Attorney, Agent, or Firm*—Kolisch Hartwell Dickerson McCormack & Heuser

[57] ABSTRACT

The present invention provides a polymerizable printing ink. The ink includes a polar suspending medium in which a plurality of polymer microspheres are suspended. At least one surfactant is dissolved in the suspending medium, and a monomer is positioned in the ink such that polymerization of the monomer after the application of the ink to a substrate will hold the microspheres in fixed relations to one another. The microspheres have a chemically associated coloring agent to provide the ink with color. The ink may include a polymerization initiator, such as a photoinitiator, to cause the film to polymerize upon the application of a form of energy, such as ultraviolet light. The invention also provides methods for making and using the ink, and for adding a coloring agent to a plurality of polymer microspheres.

36 Claims, 6 Drawing Sheets

POLYMERIZABLE INK COMPOSITION

BACKGROUND OF THE INVENTION

The present invention relates to a polymerizable printing ink that is suitable for use with inkjet printers.

Polymerizable inks are well known in the printing industry. These inks are cured into thin, tough, abrasion-resistant films after printing by causing the polymerization of a monomer incorporated within the ink. Conventional polymerizable inks include a solvent, at least one monomer or oligomer, an initiator, various additives, and a pigment or dye. The monomer or oligomer is sometimes referred to as a pre-polymer. In the polymerization process, individual molecules of monomer are chemically bonded together to form a large polymer molecule. For example, polymerization of the monomer styrene ($C_6H_5CH=CH_2$) yields the polymer polystyrene ($—(C_6H_5CHCH_2)_n—$). A polymer may be a homopolymer, which is formed from a single monomer, or a heteropolymer, which is formed by the copolymerization of two or more different monomers. Polystyrene is an example of a homopolymer. An example of a heteropolymer would be styrene/butadiene, formed by the copolymerization of styrene and butadiene.

Initiators are molecules that are used to initiate a polymerization reaction. Generally, an initiator is a molecule that will decompose into a free radical-containing species upon the application of some form of energy. The free radical-containing species then attacks an unsaturated bond in a monomer molecule. This step both bonds the initiator to the monomer and converts the monomer into a free radical, which is then available to attack another monomer molecule. The resulting chain of free radical reactions is the polymerization process.

Various types of initiators are available. For example, a photoinitiator is a molecule that decomposes into a free radical-containing species upon the absorption of a photon of radiant energy, generally ultraviolet light. An example of a commonly used photoinitiator is benzophenone. A thermal initiator decomposes into a free radical-containing species upon the application of heat. An example of a thermal initiator is the water-soluble compound potassium persulfate. The persulfate ion ($S_2O_8^{2-}$) decomposes into two sulfate ion free radicals ($SO_4 \cdot^-$) upon heating, both of which can then initiate a polymerization. The polymer chain grows in one direction away from the initiating species such that the polymer is terminated on one end by this species. Thus, polymers initiated with potassium persulfate are terminated on one end by a sulfate group. The polymerization reaction continues outward from this group until either all of the monomer is consumed or the free radical reacts with another free radical to terminate polymerization.

Various additives well known in the art are typically included in a photopolymerizable ink to solve problems associated with a particular ink formulation. For instance, some degree of polymerization may occur in an ink before it is applied to a substrate. This can both increase the viscosity of the ink and cause premature gelation. To remedy this, polymerization inhibitors such as antioxidants can be added to prevent premature polymerization and thus increase the shelf life of the ink. Another potential problem with an ink is the beading of an ink on a substrate surface caused by too high a surface tension in the ink. Beading prevents the ink from coating the substrate and results in lowered printing resolution. To prevent this, a wetting agent may be included to lower the surface tension of the ink and increase its tendency to coat the substrate. Additives are also added to inks to impart desired physical characteristics to an ink. For instance, if it is desired that the ink be flexible after it is cured so that it does not crack or peel from the substrate when the substrate is somehow deformed, a plasticizer can be added. If a faster curing time is desired, an accelerator may be included to increase the rate of polymerization of the ink. Also, it is important that the cured ink film bond well to the substrate. The addition of an adhesion promoter can be used to strengthen the adhesion of the ink film to a substrate when necessary. This list of additives is not exclusive; others may be added to the ink to give it any desired physical properties.

A coloring agent, either a dye or pigment, is dissolved or suspended in the solvent to give the ink color. Though there is no generally accepted distinction between dyes and pigments, most pigments are insoluble inorganic powders, while most dyes are insoluble, synthetic organic compounds. The coloring effect from pigments is a result of their dispersion in a liquid or solid medium. Because they are insoluble, an even dispersion of pigment in the medium is difficult to achieve. A pigmented ink must be stirred vigorously before use to ensure the best pigment dispersion possible. Stilling can not ensure that the pigment will remain well dispersed, however, because the pigment may settle out of the ink between printing and curing. Also, the particle sizes of the pigment fragments in an ink are non-uniform. Because the color intensity in a given region of a sample of a pigmented ink is directly proportional to the total amount of pigment present in that part of the ink, inconsistencies in color may occur in even a well-dispersed ink due to a non-uniform particle-size dispersion in the ink.

The use of a dye solves the problem of color inconsistencies due to different pigment particle sizes because the dye is dissolved in the ink solvent. Moreover, a wide variety of bright colors can be achieved by using organic dyes in an ink. However, the organic dyes tend to be less stable than pigments when exposed to environmental factors such as sunlight and chemical agents. Photobleaching, or the fading of the color of an ink when exposed to light, is a particular problem with photopolymerizable inks, as the ink must be exposed to dye-degrading ultraviolet light to initiate the polymerization reaction.

Many photopolymerizable ink mixtures are known. Bolon et al., U.S. Pat. No. 3,957,694; Batt et al., U.S. Pat. No. 4,137,138; Sakiyama et al., U.S. Pat. No. 4,221,686; Kurpiewski et al., U.S. Pat. No. 4,780,487; Lucey, U.S. Pat. No. 5,180,757; Amon et al., U.S. Pat. No. 5,658,964; and Erickson et al., U.S. Statutory Invention Registration No. H1517, all disclose photopolymerizable ink compositions for various uses. However, these inks are still subject to many of the difficulties discussed above, and none attempt to give superior protection to dyes against photobleaching or to disperse inorganic pigments more thoroughly. Additionally, further problems must be addressed when an ink is to be used in an inkjet printing process.

Inks must have certain flow and deformation characteristics under stress and strain, collectively known as rheological characteristics, to be to be suitable for use with an inkjet printing system. The particular rheological properties desirable in an ink may differ between printing techniques. For instance, it may be desirable for an ink to display either Newtonian or non-Newtonian viscosity characteristics. A Newtonian fluid, such as water, has a constant coefficient of viscosity for any given shear stress. Because of this, the rate of flow of a Newtonian fluid is directly proportional to the shear stress applied to the fluid. A non-Newtonian fluid has a variable coefficient of viscosity, which is referred to as the "apparent viscosity" at a given shear stress. For some applications it may be desirable for an ink to be a Newtonian fluid. Due to its constant coefficient of viscosity, a Newtonian ink may flow through an inkjet nozzle with less turbulence, and may be more adaptable to inkjet nozzles of different shapes and sizes.

On the other hand, it may be desirable for an ink to display some non-Newtonian behavior. For instance, it is sometimes desirable for an ink to have the non-Newtonian characteristic of thixotropy. A thixotropic material has an apparent viscosity which increases to a maximum value when the material is either at rest or subjected to a constant force, and decreases to a minimum value when it is subjected to a changing force. As an example, a thixotropic ink would have a low apparent viscosity when it is accelerated out of the inkjet orifice and when it strikes the paper. Once at rest on the paper, however, the ink would have a higher apparent viscosity, preventing it from running on the paper and preserving the resolution of the print. U.S. Pat. No. 5,024,700 to Britton, Jr. discloses a printing ink containing a thixotropic compound. A property similar to thixotropy is yield stress. A material with a yield stress requires the application of some minimum force before it will begin to flow. Thus, an ink with a significant yield stress would also resist running on paper after printing.

Suspensions of pigments in solvents may cause the solvent to unpredictably exhibit undesirable rheological characteristics. A potential cause of this problem is the morphology of the pigment particles. As mentioned earlier, the pigment particles may have a non-uniform size distribution. Furthermore, the pigment fragments may be irregularly shaped. The frictional interactions between pigment fragments in an ink heavily loaded with such a pigment may be inconsistent, and the particles may randomly aggregate and redisperse. Such interactions may prevent the solution from having predictable viscosity or flow characteristics, and thus may cause unpredictable behavior.

A fluid containing high concentrations of substantially uniform particles, on the other hand, may still demonstrate Newtonian behavior. In particular, it has been shown that suspensions of monodisperse polymer microspheres demonstrate such behavior. See Fukada, et al., Biorheology 26, 401–03 (1989) for a discussion of the rheological characteristics of aqueous suspensions of polymer microspheres. A polymer microsphere is a very small diameter, highly symmetrical sphere of a polymer such as polystyrene or polyvinyltoluene. Typical diameters of polymer microspheres range from 0.1 micrometer to 100 micrometers. Monodisperse polymer microspheres are microspheres having a substantially uniform and narrow size distribution. Polymer microspheres have many uses, including the use as a standard for electron microscopy calibration, blood flow modeling, latex agglutination tests in the field of immunodiagnostics, and various uses in phagocytosis research. A more complete list of uses for polymer microspheres is given by Leigh B. Bangs, *Uniform Latex Particles*, Seradyn, Inc., Particle Technology Division, 4$^{th}$ printing November 1987, p. 47–58.

Several different synthetic techniques can be used to produce polymer microspheres, depending upon the size of the microsphere product desired. For microspheres larger than 2 microns a multi-step swollen emulsion polymerization can be used. For microspheres smaller than about 2 microns, either an emulsification polymerization or an emulsifier-free polymerization can be used. The emulsification polymerizations are described in the Bangs article, *Uniform Latex Particles*, mentioned above. The single-step emulsification polymerization is performed by first mixing an aqueous surfactant solution so that the surfactant molecules form micelles. Next, a monomer such as styrene is mixed into the solution. Most of the monomer enters and swells the micelles, but some stays in the aqueous phase. To initiate the polymerization of the monomer dissolved in the micelles, a water-soluble initiator such as potassium persulfate is added to the solution. The solution is heated to generate sulfate ion free radicals, which then react with the aqueous styrene to initiate polymerization. The growing polystyrene chains in the aqueous phase soon migrate to the micelles, where their hydrocarbon ends are more soluble. The reaction continues in the micelles until either the chain reacts with another free radical or all of the monomer in the micelles is used up. Thus, when the chain reaction is complete, the polymer molecules will occupy the area inside the micelles formerly occupied by the monomer. The size of the spheres can be controlled by the choice of surfactant used.

Polymer microspheres have a surface charge resulting from the presence of charged groups on the microsphere surface. The electrostatic repulsion of these like-charged surface groups prevents aggregation of the microspheres. To do so, however, the repulsive forces must be sufficiently strong to overcome the attractive van der Waals forces between the microspheres. The primary source of these surface groups on emulsification-polymerized microspheres is the residual surfactant adsorbed to the surface of the microsphere. Intrinsic surface groups originating from the initiator are also present in a lesser quantity. If an ionic initiator was used for the polymerization, the end group of the polymer will be charged and will remain on the microsphere surface when the growing polymer chain migrates from the aqueous phase to the micelle interior. As an example, a microsphere synthesized in a sodium dodecyl sulfate solution (a common surfactant) using potassium persulfate as an initiator will have both intrinsic sulfate surface groups originating from the initiator and sulfate surface groups belonging to the surfactant.

The emulsification polymerization synthesis is not the preferred synthesis for smaller microspheres, however. In order to control the colloidal stability of polymer microspheres to prevent aggregation, it is desirable to have the ability to closely control the surface charge density of the microspheres. Aggregation of microspheres can disrupt the flow characteristics of the microsphere suspension. See Fukada, et al., Biorheology 26, 401–03 (1989), for a discussion of the effects of aggregation on the flow characteristics of a microsphere suspension. To control the surface charge on a microsphere, it is desirable to add a precise, known quantity of surfactant to the surface of each microsphere. The emuslification polymerization process, however, does not allow the ready control of the density of the surface electrical charge of the microspheres. Instead, the surfaces of microspheres synthesized by the emulsification process typically exhibit a variable surface charge density. Because of this, the surfactant from the emulsification process must be removed by washing or ion exchange so that, if needed, a known quantity of surfactant can then be added to the microsphere surfaces. The surfactant removal is difficult to perform to completion, and can itself cause aggregation, because the number of intrinsic surface groups present on these polymer microspheres is too low to counteract the attractive forces between microspheres without the assistance of the surfactant.

Better results are achieved when an emulsifier-free polymerization is used to synthesize small polymer microspheres. An emulsifier-free polymerization yields microspheres with a higher concentration of intrinsic surface groups so that the microspheres are stable in suspension even without additional surfactant. Moreover, the surface charge density of these microspheres is easily adjusted in a controlled fashion by the addition of a surfactant to the microsphere solution after the synthesis is complete. An example of an emulsifier-free synthesis, given in Goodwin, et al., Colloid & Polymer Sci. 252, No. 6, 461–74 (1974), is as follows: First, styrene is dissolved in water. Next, an initiator such as potassium persulfate is mixed into the solution, and the solution is heated. Small surface active oligomers form, which grow, associate, nucleate, and form particles which subsequently become swollen with monomer. The hydrophilic sulfate groups from the initiator stay on the surface of the nucleating particles. Eventually, enough charged surface groups form on the growing particle to give the particle an adequate electrostatic surface potential to be colloidally stable. At this point, the particle has enough intrinsic surface groups to repel other particles, and the polymerization continues within the particle until the microsphere is complete. The diameters of the microspheres formed can be controlled through careful manipulation of the ionic strength of the aqueous solution, the monomer concentration, the initiator concentration, and the reaction temperature. This synthesis provides microspheres with both an adequate surface potential to be colloidally stable in water without any added surfactant, and a surface free of the residual surfactant contaminants that are produced by other synthetic methods. After synthesis, the surface charge density of the microspheres can be accurately tailored to suit a particular purpose. The effects of ionic strength, monomer concentration, initiator concentration, and temperature on microsphere diameter are discussed in the Goodwin article mentioned earlier.

Pigments and dyes, collectively referred to as coloring agents, can be added to microspheres. The coloring agent can either be chemically bonded to the outside of a microsphere, chemically included within the microsphere, or can completely permeate the microsphere by being both bonded to the outside and included within. Either inclusion of the coloring agent within the microsphere or complete permeation is preferred because a much greater number of coloring agent molecules or particles can be added to each microsphere, resulting in more intense colors. A process for dyeing microspheres is described in *Uniform Latex Particles* by Bangs, cited above. As described in this article, the process of dyeing the microspheres involves first preparing a dilute suspension of microspheres in water. Next, an oil-soluble dye is dissolved in an essentially nonpolar organic solvent. The polarity of a solvent is an expression of the net dipole moment, or the degree of asymmetry in the electron charge density, of the solvent molecules. An essentially nonpolar solvent has little to no net dipole moment, and dissolves nonpolar molecules, such as many dye molecules, that will not dissolve in a polar solvent, such as water. After dissolving the dye in the organic solvent, the organic solvent-dye mixture is added dropwise to the aqueous microsphere suspension while gently stirring the suspension. The organic dye mixture swells the microspheres and incorporates the dye within the microspheres. After maximum dye loading has been achieved, the organic solvent is distilled out of the solution using a rotary evaporator at an elevated temperature.

The coloring process disclosed in the Bangs article, however, is far from ideal. The addition of the organic solvent-dye mixture to the aqueous phase must be performed very slowly or it will not work. It is thus very time consuming, and can take hours or even days. Moreover, if the organic phase is added to the aqueous phase too quickly, the microspheres will actually dissolve in the organic phase, resulting in the formation of large, sticky globules of dye/solvent/polymer and ruining the microsphere suspension. There is always a chance that this will happen even if the process is performed slowly and carefully. Thus, this process is not suitable for the large-scale production of colored polymer microspheres.

Accordingly, it is a general object of the present invention to provide an improved polymerizable ink. More specific objects of the present invention are to provide an improved pigment for use in an ink and a method for making the same, to provide a polymerizable ink that offers superior protection from photobleaching to dyes, to provide an ink that disperses pigments uniformly without stirring, to provide an ink for use with inkjet printing methods that has highly controllable and predictable rheological characteristics, and to provide methods for making and using an ink with the above qualities.

SUMMARY OF THE INVENTION

One aspect of the present invention provides a polymerizable printing ink. The ink includes a polar suspending medium in which a plurality of polymer microspheres are suspended. At least one surfactant is dissolved in the suspending medium, and a monomer is positioned in the ink such that polymerization of the monomer after the application of the ink to a substrate secures the microspheres in a fixed relation to one another. The polymer microspheres have a chemically associated coloring agent to provide the ink with color. The ink may include a polymerization initiator, such as a photoinitiator, to cause the film to polymerize upon the application of a form of energy, such as ultraviolet light.

Another aspect of the present invention provides a printed colored polymer film for depicting graphics on a substrate, including a plurality of polymer microspheres dispersed in a polymer matrix, and a coloring agent incorporated within the microspheres.

Another aspect of the present invention provides a method of making a polymerizable printing ink for printing a colored film on a substrate. The method includes (1) mixing at least one surfactant into a suspending medium that is at least partially aqueous, (2) forming a plurality of polymer microspheres so that the microspheres have at least some unreacted monomer associated therewith, (3) adding a coloring agent to the microspheres so that the coloring agent becomes incorporated within the microspheres to form a plurality of microsphere-coloring agent complexes, and (4) mixing the microsphere-coloring agent complexes into the suspending medium.

An additional aspect of the present invention provides a process for forming a colored polymer microsphere film on a substrate. The process includes (1) mixing a photoinitiator into a suspending medium, (2) mixing at least one surfactant into the suspending medium, (3) adding a coloring agent to a plurality of polymer microspheres, the microspheres containing at least some unreacted monomer, so that the coloring agent becomes incorporated within the microspheres to form a plurality of microsphere-coloring agent complexes, (4) mixing the microsphere-coloring agent complexes into the suspending medium, (5) transferring the suspending medium solution onto the substrate, and (6) exposing the suspending medium solution to radiation, so that the unreacted monomer polymerizes and traps the microsphere-coloring agent complexes in a polymerized film.

Yet another aspect of the present invention provides a process for dyeing a plurality of polymer microspheres with interiors. The process includes (1) dissolving a hydrophobic dye into a volume of a solvent in which the dye is freely soluble to make a dye solution, (2) adding a polar organic solvent to the dye solution, (3) mixing the microspheres into a solvent that is at least partially aqueous to form an aqueous suspension of microspheres, (4) adding the dye solution to the aqueous suspension of microspheres so that the dye solution swells the microspheres and disperses the dye uniformly within the interiors of the microspheres, and (5) evaporating a substantial amount of the solvents from the suspension of microspheres so that the microspheres reduce in size and trap the dye substantially within their interiors.

By using the ink composition of the present invention, and/or by practicing the methods of the present invention, many of the drawbacks encountered with prior art compositions and methods can be overcome. Other various objects and advantages which are attained by the invention will become more fully apparent as the description which now follows is read in conjunction with the drawings.

DETAILED DESCRIPTION OF THE PREFERRED EMBODIMENTS

The present invention provides a novel polymerizable ink and methods for making and using the ink which address at least some of the problems encountered with prior art inks. The present ink includes a polar suspending medium in which are dispersed a plurality of polymer microspheres and at least one surfactant. Additionally, a monomer is positioned in the ink such that the monomer can be polymerized to form a film after the ink is applied to a substrate. The microspheres act as a pigment in the ink. They are of substantially uniform size, have a consistent color intensity, and are dispersed thoroughly in the suspending medium. They are colored by the incorporation of a dye or pigment into their interiors. The use of colored microspheres in an ink is superior to the use of ordinary pigments because the microspheres provide a regularity in color distribution not easily achieved through the use of ordinary pigments. The use of the colored microspheres is also superior to the use of organic dyes alone, because the microspheres offer better protection to the dyes from photobleaching. Moreover, suspensions of concentrations of up to 32% of these microspheres in water behave as Newtonian fluids, allowing a very high concentration of microspheres to be added to an ink formulation while maintaining predictable and controllable ink performance.

Figure 1:
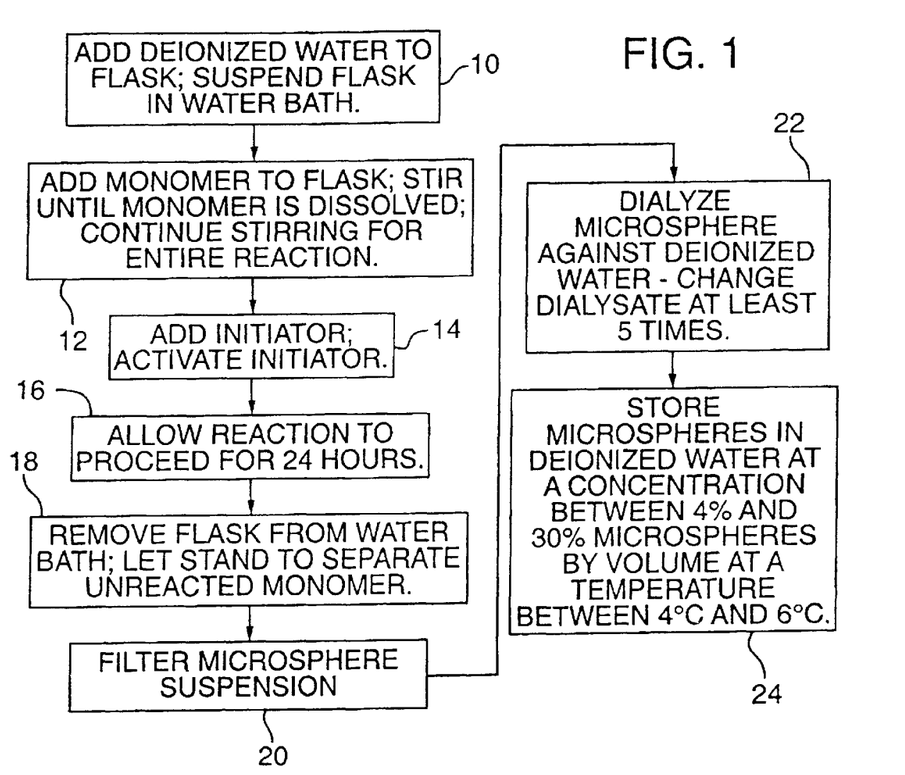
FIG. 1 is a flow diagram showing how to make the microspheres to be with various embodiments of the invention.

Although microspheres synthesized by any method may be suitable for use in an ink, the preferred microspheres are those prepared using a non-emulsifier polymerization synthesis due to their superior surface charge properties. The surfaces of these microspheres are clean and surfactant-free, allowing the surface charge density of the microspheres to be carefully tailored through the subsequent addition of controlled amounts of surfactant. Non-emulsifier techniques of making polymer microspheres are well known in the art. The following conventional non-emulsifier synthesis, shown sequentially in FIG. 1, is suitable for making microspheres for an ink: First, an aqueous styrene solution is created by first adding deionized water to a round-bottomed flask, as indicated in FIG. 1 at step 10, and then adding a desired amount of purified styrene to the deionized water while stilling, as indicated at step 12. Suitable amounts for a synthesis would be 73 grams of styrene and 670 milliliters of deionized water. The flask is fitted with a reflux condenser, and is largely immersed in a water bath to control the temperature of the reaction. Nitrogen gas may be bubbled through the reaction mixture to remove oxygen from the mixture. The styrene should be stilled into the water for approximately 15 minutes. After this, an initiator solution, such as potassium persulfate dissolved in a desired amount into 30–50 milliliters of deionized water, is added to the reaction solution at step 14, and then activated to begin the polymerization of the microspheres. The initiator reacts with the monomer, and will remain on or near the outside surface of the growing microspheres. Thus, the initiator is chosen to give the microspheres desired surface characteristics. Potassium persulfate will cause the microspheres to have sulfate groups on their surfaces. More hydrophilic microspheres with higher surface charges could be created by the addition of a shell to the microspheres; for example, acrylic acid and styrene can be copolymerized to form the shell. The reaction should be allowed to proceed for a period of about 4 to 36 hours, depending on the temperature of the reaction, as indicated at step 16. At the end of the reaction time, the flask is removed from the water bath at step 18 and allowed to stand for a short period of time to separate unreacted monomer from the mixture. The microsphere latex formed in the aqueous reaction phase is filtered out of the reaction mixture at step 20 and dialyzed against deionized water at step 22 to remove any unreacted monomer not incorporated within the microspheres, any ionic species that had been added to the solution, and excess initiator. The dialysis is considered complete when the conductance of the dialysate approaches that of distilled water. The resulting microspheres have a homogeneous cross section; there is no void in the center. After synthesis, the microspheres should be stored suspended in deionized water at a concentration of between 4 and 30% microspheres by volume in a sealed polyethylene container at 4 to 6° C., as indicated at step 24. Care should be taken to avoid freezing the suspension, as freezing may fracture the microspheres.

Though styrene is used as the monomer in the example synthesis above, many other monomers are equally suitable for the synthesis of polymer microspheres. Examples of other suitable monomers include bromostyrene, acrylic acid, acrylonitrile, acrylamide, methyl methacrylate, butadiene, divinylbenzene, vinyltoluene, vinyl acetate, vinyl pyridine, vinylidene chloride, vinyl chloride, isoprene, and derivatives of these compounds. Additionally, microspheres suitable for use in an ink formulation may be made of copolymers of the above monomers, including styrene/butadiene, styrene/vinyltoluene, and vinyltoluene/tert-butylstyrene.

The above synthesis produces microspheres which are monodisperse, or substantially uniform in size. It is important that the microspheres be monodisperse for two primary reasons. First, monodisperse polymer will have a known and reliable specific surface area and predictable physical and chemical properties. Second, aqueous suspensions of monodisperse polymer retain predictable flow behavior even when mixed in concentrations of up to 32%. The size of the microspheres synthesized by this technique is dependent upon the concentrations of monomer and initiator used, the ionic strength of the reaction solution, and the temperature of the reaction. The size of the microspheres can be increased by increasing the concentration of monomer, by increasing the ionic strength of the solution, by decreasing the reaction temperature, or by decreasing the concentration of initiator. Likewise, the size can be decreased by using less monomer, by decreasing the ionic strength of the solution, by increasing the reaction temperature, or by using more initiator. When synthesizing the microspheres, it is preferred to minimize the ionic strength of the reaction mixture (the minimum value will be determined by the number of ions generated by dissolving the initiator into the reaction mixture) so that the particles will not aggregate during the process. The size of the microspheres can be measured by transmission electron microscopy. It is preferred that they have a mean diameter between 0.2 and 2.0 microns, with a coefficient of variation on the diameter of less than 5%.

In a particularly preferred embodiment of the present invention, the monodisperse polymer microspheres have a mean diameter of approximately 0.5 microns or less. Microspheres this size will be colloidally stable in an aqueous suspension for years without the addition of any emulsifiers or other stabilizers. Thus, microsphere pigment particles of this size would remain dispersed in an ink almost indefinitely without any need for stirring. Conversely, loading larger microspheres with high levels of very dark pigments may result in microspheres with sufficient density to have an appreciable rate of sedimentation. It is therefore preferable to use the 0.5 micron or smaller microspheres with inkjet printers, because it is difficult and impracticable to agitate the inks in an inkjet printer cartridge before applying them to a substrate. Also, there is less risk that the pigments will settle out of the ink before the ink is polymerized, thus permitting a longer time to pass between depositing the ink on the substrate and curing it.

Microspheres can be made to be either substantially completely polymerized, or to be incompletely polymerized such that they have a substantial amount of unreacted monomer incorporated within each microsphere. Microspheres that have been substantially completely polymerized ("hard" microspheres) resist deformation. They may contain as little as 2% unreacted monomer by weight. Aqueous suspensions of concentrations as high as 32% by volume of these microspheres behave as a Newtonian fluid. Microspheres that contain a substantial amount of unreacted monomer ("soft microspheres"), on the other hand, are more deformable. As a result, concentrated suspensions of these microspheres may be thixotropic. Thus, the thixotropic characteristics of the present ink can be controllably modified by either manipulating the amount of monomer that is present in the final microspheres, or by carefully mixing amounts of "hard" and "soft" microspheres together. The residual monomer, content of the microspheres is controlled by manipulating the ratio of monomer to initiator in the microsphere synthesis. The addition of excess monomer will result in greater concentration of unreacted monomer in the microspheres. The use of lower reaction temperatures will give the same result.

Before they are added to the ink solution as a pigment, the microspheres must be dyed. Dyes are often mixtures of several different compounds, and inconsistencies in color can exist between different lots of the sane dye. Thus, as shown at step 26 in FIG. 2, each lot of dye will need to be inspected optically to confirm that the color of the dye conforms to the desired color of the ink. Additionally, each lot of dye should be tested by thin-layer chromatography on silica gel plates and by UV-visible absorption spectroscopy and infrared absorption spectroscopy to verify product consistency.

Figure 2:
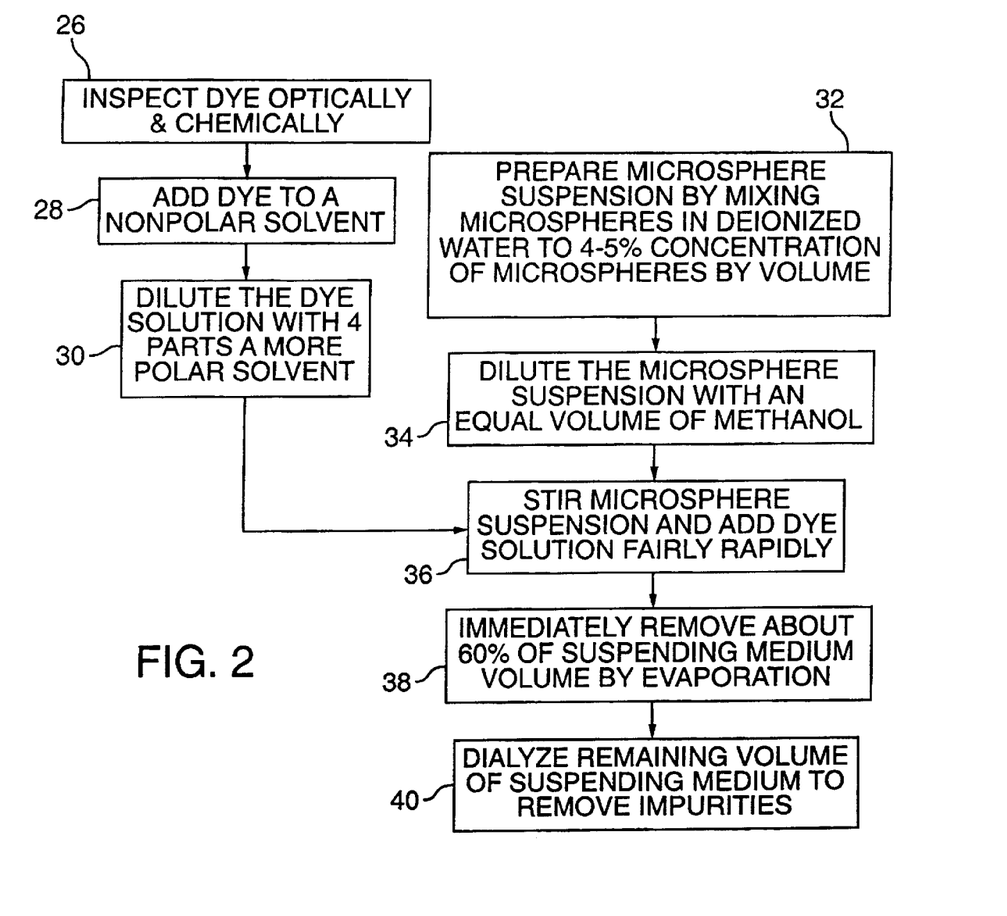
FIG. 2 is a flow diagram showing how to incorporate dye into the microspheres according to an embodiment of the invention.

Once the dye color and quality is verified, a dye solution is prepared. Generally, the color intensity of the dye solution is mixed to be stronger than the intensity desired for the microspheres, as the intensity will be decreased by dilution when the dye solution is added to the microsphere suspension. The dye solution is prepared by first adding the dye to an essentially nonpolar solvent in which it is freely soluble, shown at step 28, and then diluting the solution with a more polar organic solvent, such as an alkyl alcohol, at step 30. In a preferred embodiment of the dyeing process, the dye is dissolved in methylene chloride, with the subsequent addition of ethanol. In a particularly preferred embodiment, the solvent mixture is four volumes ethanol and one volume methylene chloride. Next, at step 32, a microsphere suspension is prepared for dyeing by adding microspheres, preferably microspheres that have been prepared by the previous synthesis, to a polar solvent. A preferred solvent for the microsphere suspension is a mixture of methanol and deionized water. In a preferred embodiment of the method, the microspheres are first added to deionized water to a concentration of 4–5% by volume at step 32, and then an amount of methanol equal to the volume of the microsphere/water suspension is added at step 34. The microsphere suspension is then stirred, and the dye solution is added to the microsphere suspension at step 36 until all of the dye solution has been added. The entire addition need not take more than one minute for any volume of microsphere suspension and dye solution used. It is not necessary to wait for each drop of the dye to be absorbed by the microspheres as in the prior art dyeing methods, because the solvent mixture described here will not dissolve the microspheres. The solvent mixture merely causes the microspheres to swell, and allows the dye molecules to diffuse evenly throughout the interiors of the microspheres. Once all of the dye solution has been added, the organic solvents are immediately removed from the microsphere suspension at step 38 by rotary evaporation at room temperature. This shrinks the microspheres back to approximately their original size and locks the dye molecules mostly within the microspheres, although some may be bonded to the microsphere surface. In a preferred embodiment, about 60% of suspending medium is removed by rotary evaporation at room temperature, and the remaining suspending medium is purified by dialysis against deionized water at step 40. The dialysis also removes excess dye that was not incorporated into the microsphere interiors during the dye-addition step. The dialysate should be changed at least five times over the duration of the process. The dyeing process produces an aqueous suspension of colored polymer microspheres, which can then be stored in the same manner as the uncolored microspheres until they are used in the production of an ink. Because the dyes are hydrophobic, there is no danger of them leaching from the microspheres into the aqueous phase of the ink.

Practically any hydrophobic dye can be used to dye microspheres by this process. Examples of suitable dyes are C1 Solvent Yellow 19 No. 13900:1, C1 solvent Orange 4S No. 11700:1, C1 Solvent Red 8 No. 12715, Victoria Blue, methyl violet, and nigrosine. The dye can be loaded in a microsphere up to a weight of 20% of the total particle weight for use in an ink. A fairly comprehensive list of dyes is given on pages 110–183 in The Printing Ink Manual, Fourth Edition, edited by R. H. Leach, C. Armstrong, J. F. Brown, M. J. MacKenzie, L. Randall and H. G. Smith, and published by Chapman & Hall, London (1991).

Once colored microspheres have been obtained, preferably by the above processes, the ink of the present invention can be prepared. The essential components of the ink are the colored polymer microspheres, a polar suspending medium, and at least one surfactant dissolved in the suspending medium. The suspending medium must be polar to prevent the microspheres from dissolving and to prevent dye from being leached from the microspheres. Suitable solvents include deionized water, as well as mixtures of 30–100% deionized water with 0–70% of a lower molecular weight alkyl alcohol. Lower molecular weight alkyl alcohols refer to those having five or fewer carbon atoms. Preferred lower molecular weight alkyl alcohols are methanol, ethanol and isopropanol. The addition of the alcohol lowers the overall polarity of the solvent, and also promotes faster evaporative drying of the ink on a substrate after the ink has been polymerized. The surfactant is added to further stabilize the microspheres against aggregation by coating the microsphere surfaces to increase their surface potential. Numerous surfactants are suitable for this purpose, and include materials commonly referred to as emulsifiers, dispersants and suspension agents. The pH of an ink formulation must be considered when selecting a surfactant for use in an ink. It is important that the pH of a microsphere ink is no lower than about 6, and preferably between 7 and 8, so the surfactant should be chosen accordingly. Examples of common surfactants and surfactant mixtures include anionic polyelectrolytes, unsaturated fatty acids, long chain carboxylic acids, long chain sulfates and sulfonates, and anionic/nonionic surfactant blends. A preferred surfactant is sodium dodecyl sulfate (SDS). The surfactant is usually mixed into the suspending medium to a concentration of 0.2 and 2.0% by weight of the suspending medium, but can also be added to the dyed microspheres before adding them to the ink if necessary.

If "soft" microspheres, containing a substantial amount of unreacted monomer, are used in the ink of this invention, it is possible to formulate a useable ink made of only the microspheres, a surfactant and a suspending medium. The polymerization of such an ink after printing could be accomplished by a catalytic process involving the substrate surface, a heating process, or other mechanisms. This polymerization would result in the microspheres being chemically bonded to one another. It is preferred, however, to add other components to the ink to adjust more finely the physical properties of the ink.

If "hard" microspheres, or those having very little unreacted monomer, are used in an ink, a monomer must be added to the suspending medium for the ink to be polymerizable after printing. A monomer can also be used in an ink containing "soft" microspheres. The monomer chosen for this use can be the same monomer from which the microspheres were synthesized, or a different monomers Suitable monomers include any monomer with at least one unsaturated group that is soluble, or even slightly soluble, in a polar solvent. Examples of suitable monomers include butadiene, divinylbenzene, vinyltoluene, vinyl chloride, acrylate derivatives, amide derivatives, siloxanes, and cyanurates. The concentration of the monomer can range between 3 and 10% of the printing ink mixture by weight. If an ink containing an added monomer and "hard" microspheres is polymerized on a substrate, the resulting film is characterized by an array of microspheres physically trapped in a matrix of polymer that forms in the suspending medium around the microspheres. There will be relatively little chemical bonding between microspheres, or between microspheres and monomer/polymer in the suspending medium. Conversely, if a monomer is added to an ink with "soft" microspheres, a substantial degree of chemical bonding will occur between the microspheres and the monomer when the ink is polymerized.

An initiator may be added to an ink to increase the ease of initiating the polymerization process. Initiators permit an ink to be designed to polymerize under different conditions, as different initiators are activated by different forms of energy. For instance, if a thermal initiator is added to the ink, a film of the ink printed on a substrate would be polymerized by heating the mixture. Much less heating is necessary to initiate a polymerization when a thermal initiator is present than when the initiator is absent. Potassium persulfate is an example of a thermal initiator. In a preferred embodiment of this invention, a photoinitiator is added to the ink. An ink with a photoinitiator would be polymerized by exposing the ink to UV light after printing. Examples of suitable photoinitiators include benzophenone derivatives, benzil derivatives, thioxanthones, and diazonium derivatives. Preferred photoinitiators are 2-2-dimethoxy-2-phenyl acetophenone and 2-hydroxy-2-methyl-1-phenyl propan-1-one. The photoinitiator is added to the suspending medium before the microspheres are added, and is typically included in a concentration of between 0.2 and 3.0% of the suspending medium by weight.

Additives besides monomers and initiators may be included in an ink formulation of the present invention. Inhibitors, flame retardants, plasticizers, wetting agents, accelerators, thixotropic agents and deodorants are all typically added to inks to modify physical properties of the ink or to collect problems associated with the use of the ink. For instance, it is possible for a monomer-containing solution to undergo some polymerization while the solution is in storage. This spontaneous polymerization can cause an ink to gelate or harden while in storage. To prevent this, an inhibitor can be added. Inhibitors prevent the polymerization of the ink in the absence of the application of initiator-activating energy. Some common inhibitors include hydroquinone, p-methoxyphenol beta-napthol, tert-butyl catechol, pyrogallol and benzotriazoles. Antioxidants are a class of inhibitors, and prevent the oxidative polymerization of monomers in a solution. Suitable antioxidants include naphthols, substituted phenols, oximes, and aromatic amines. They are typically added to an ink in a concentration of 0.05–0.5% of the ink by weight.

Many inks contain a high concentration of flammable organic solvents, and deposit a film which is also flammable. For instance, many of the monomers of the present ink, such as styrene, form flammable polymer films, and the microspheres themselves can be flammable. To reduce the flammability of these inks, a flame retardant may be added. Common flame retardants include tetrabromo bisphenol α-diacrylate, aluminum trihydrate, antimony oxide, chlorinated hydrocarbons, ammonium bromide and zinc borate, and are typically included in the ink at a concentration of 0.5–1.0% of the ink by weight.

Some formulations of present ink may be inflexible or even brittle after application and polymerization. Such a film may crack when the substrate is agitated or bent. To remedy this, a plasticizer can be added to the ink to improve the flexibility and mechanical integrity of the polymerized film. Common plasticizers include abietates, adipates, benzoates, butyrates, citrates, epoxidized compounds, phosphates, phthalates, polyesters, polyol esters, ricinoleates, sebacates, stearates, and sulfonamines, and are typically included in the ink at a concentration of 0.2–3.0% of the ink by weight.

The aqueous inks of the present invention may have a tendency to bead on substrate surfaces due to the high surface tensions of water and water/alcohol solvent mixtures. Beading can lower the resolution of text or graphics printed with the ink. A wetting agent can be added to an ink to lower the surface tension of the ink and improve its ability to wet a substrate surface. Common wetting agents include polyethylene glycol fatty acid esters, nonyl phenol ethylene oxide, polypropoxy quanternary ammonium acetate and fluorinated hydrocarbons, and are typically included in an ink at a concentration of 0.05–2.0% of the ink by weight.

Sometimes an extremely fast curing time is desirable in an ink. For instance, if it is desired to print a thicker ink film on a substrate, the curing rate can be increased to cause the film to polymerize before it has a chance to spread on the substrate. To speed up the curing rate, a polymerization accelerator can be added to the ink. The amount of accelerator included in the ink is dependent upon how quickly it is desired for the ink to cure. Common accelerators include azonitrile, dialkyl peroxides, hydroperoxides, peroxyacids and peroxyketals.

Thixotropic agents can be added to increase the viscosity of a material when it is at rest without increasing the viscosity of the material when it is under shear stress, as it is when passing through an inkjet orifice. When "soft" microspheres are used in an ink formulation, the microspheres themselves give the ink thixotropic character. When a mixture of "hard" and "soft" microspheres are used, the degree of thixotropy of the ink can be controlled by the amount of "soft" microspheres added. When an ink uses exclusively "hard" microspheres, however, it may be desirable to add a thixotropic agent to keep the ink from running when on the paper. A suitable class of thixotropic agents for in an ink are ethanolamines. These compounds are typically included in an ink at a concentration of approximately 0.5–1.0% of the ink by weight.

The above additives do not constitute an exclusive list of those that may be used in an ink of the present invention. Other additives, such as an adhesion promoter to increase the strength of the adhesion between a polymerized ink film and a substrate, or a deodorant to mask the odor of the ink solvents, may be added when desired without departing from the scope of the present invention.

Figure 3:
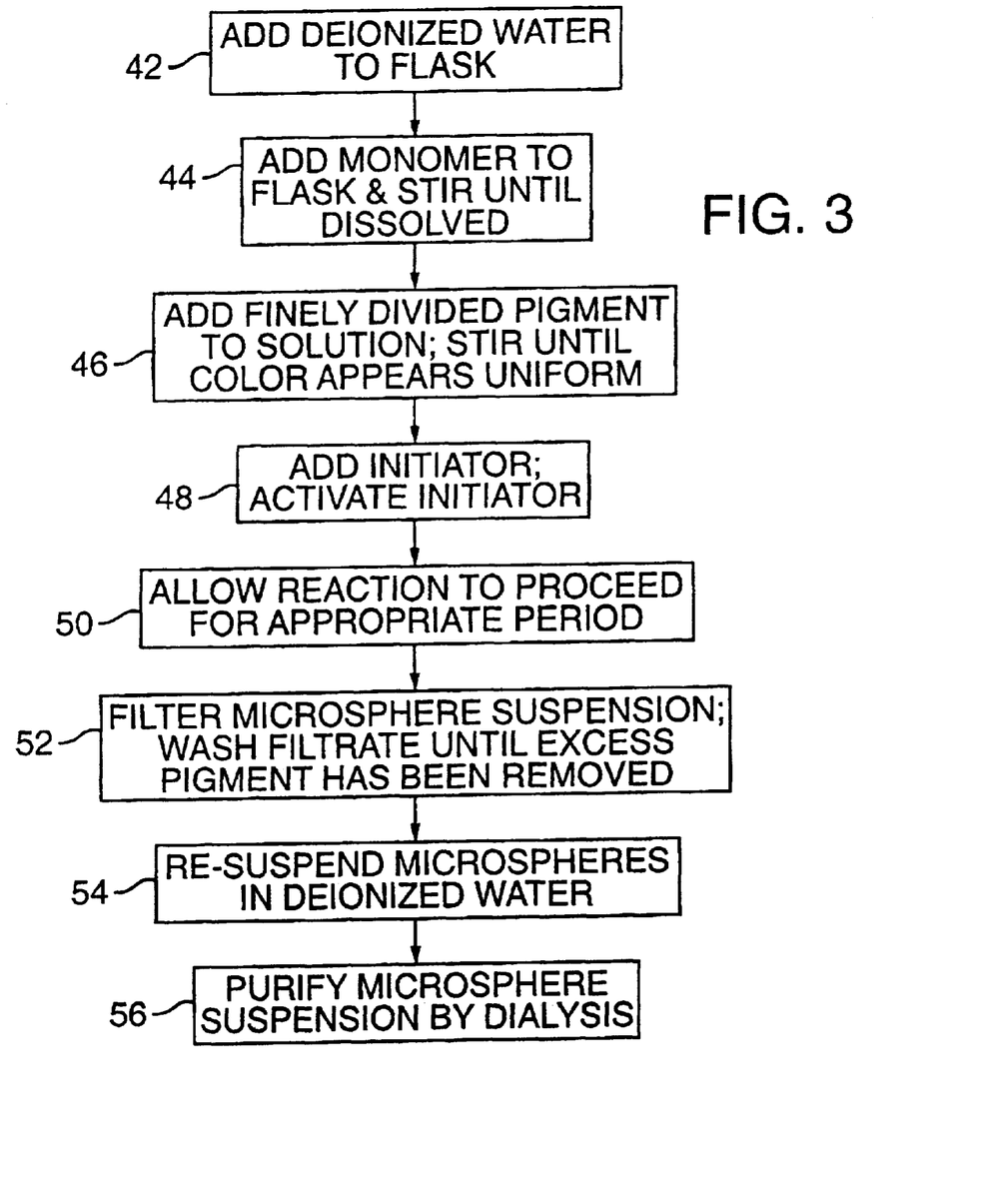
FIG. 3 is a flow diagram showing how to incorporate pigments into the microspheres for use with various embodiments of the invention.

In another embodiment of the present invention, a pigment is incorporated into the microsphere interiors instead of a dye. Because pigments are generally insoluble in most solvents, the pigments cannot be incorporated into the microsphere in the same manner as a dye. Instead, the pigments are incorporated into the microspheres during the microsphere synthesis. The process, depicted in FIG. 3, is essentially the same as regular microsphere synthesis, and can be performed as follows: First, about 670 milliliters of deionized water is added to a three-necked round bottom flask, and the flask is suspended in a water bath to control the temperature of the reaction, as indicated at step 42. Monomer is then added to the deionized water at step 44, and the mixture is stilled for 15 minutes to ensure the monomer dissolves into the water to the desired extent. If styrene is used, 73 grams is a suitable amount. Other monomers must be added to the water in an amount determined by their solubility in water. After stirring for 15 minutes, a finely divided pigment is added to the mixture and stilled in, as shown at step 46. Pigments with extremely fine particle sizes are desired; particles on the order of 0.02 micron are ideal. Pigments with particle sizes this small are available commercially, and many are listed in the above-referenced Printing Ink Manual on pages 100–163. When the solution appears to have a uniform color intensity, the initiator, potassium persulfate dissolved in 30 milliliters of water, is added at step 48, washed in with an additional 20 milliliters of water, and activated. The reaction is then allowed to proceed for approximately 24 hours, indicated at step 50. At the end of the reaction time, the suspension is filtered through a filter with a pore size larger than the pigment particle size but smaller than the microsphere diameter, as shown at step 52. A suitable filter paper for this use would be a 0.10 micron pore cellulose nitrate membrane, such as Cole-Parmer Instrument Co. catalog number E-06639-25. Once the microspheres have been filtered from the suspension, they are washed multiple times with deionized water while still in the filter paper, indicated at step 54. The filtrate should be washed until the washing solvent is not discolored by the filtrate. Once the excess pigment is removed from the microsphere suspension, the microspheres are re-suspended in deionized water and dialyzed against deionized water at step 56 until the conductance of the dialysate approaches that of deionized water. Many pigments are suitable for being incorporated into microspheres according to the present invention. Some examples are aceto-acetarylamides, diarylide yellow, diarylide orange, naphthol red, toluidine red, azo magenta G, PMTA deep green, phthalocyanine green, ultramarine blue, methyl violet, crystal violet, dioxazine violet B, carbon black, and titanium dioxide. The use of pigmented microspheres is superior to the use of the pigments alone because the microspheres flow more predictably through inkjet orifices and can be designed to resist sedimentation. In the present invention, microspheres with pigments incorporated may be used in the same manner as microspheres with dyes incorporated.

The inks of the present invention are simple and straightforward to use. They can be applied to a substrate by any common printing technique, but are especially suited for use with inkjet printers. After an ink is applied to a substrate, the initiator is activated. If the initiator is a thermal initiator, the substrate is heated to a sufficient temperature to activate the initiator. The initiator should be chosen so that the activation temperature is not so high as to damage the substrate. If a photoinitiator is used, the printed ink is simply exposed to an ultraviolet light after printing.

Figure 4:
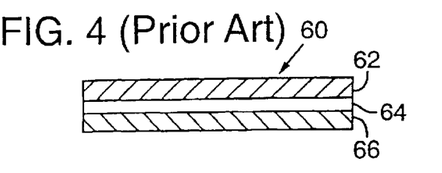
FIG. 4 is a side elevation sectional view of a prior art releasable vinyl film.
Figure 5:
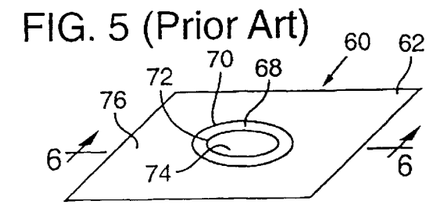
FIG. 5 is a perspective view of a graphic cut into a prior art releasable vinyl film.
Figure 6:
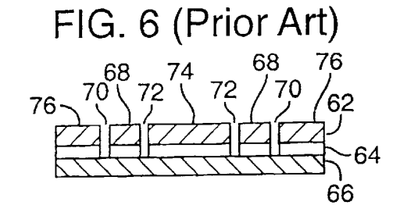
FIG. 6 is a side elevation sectional view taken along line 6—6 of FIG. 5.

One particular use of these inks is in the display, advertising and sign industries. Currently the majority of signs and displays are printed or fabricated using a vinyl transfer process. This process, depicted in FIGS. 4–16, is quite inefficient and labor intensive. Referring to FIG. 4, the vinyl transfer process begins with the use of a vinyl starting material sheet 60 comprising a vinyl film 62 which is removably attached to a release sheet 66 by an adhesive 64. These sheets are sold in rolls, and each roll has a single color. Thus, multiple rolls of the sheets must be kept in inventory if it is desired to have a broad color selection close at hand. In the transfer process, first a desired character or graphic 68 is defined in the starting material 60. As an example, the letter "O" is shown in FIG. 5. This graphic 68 is defined by making an outer cut 70 and an inner cut 72 into the starting material sheet 60 to separate the vinyl film region containing the graphic 68 from the background material regions, shown at 74 and 76. The cuts 70 and 72 go through both the vinyl film 62 and the adhesive 64, but not the release sheet 66, as shown in FIG. 6.

Figure 7:
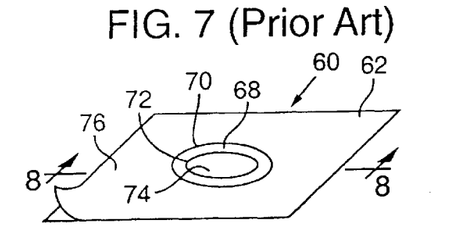
FIG. 7 is a perspective view of a prior art releasable vinyl film with the background material partially removed.
Figure 8:
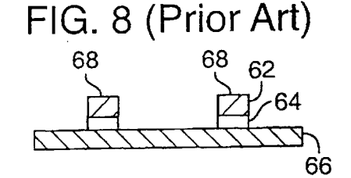
FIG. 8 is a side elevation sectional view taken along line 8—8 of FIG. 7.

Next, the background material 74 and 76 is removed in a process called "weeding", shown in FIG. 7. This leaves only the vinyl film region that defines the graphics 68 on the release sheet 66. FIG. 8 shows a cross-sectional view of the vinyl starling material sheet after the background material has been removed. The process of weeding is slow and labor intensive, and results in the waste of much starting material.

Figure 9:
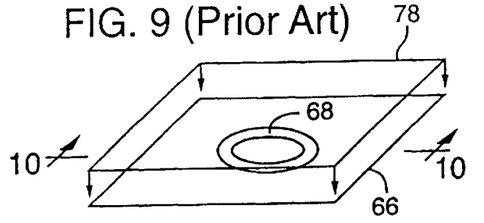
FIG. 9 is a perspective view of a graphic cut from a prior art releasable vinyl film with a transfer sheet positioned above the graphic.
Figure 10:
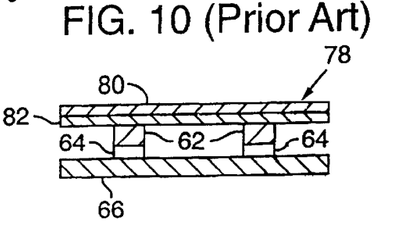
FIG. 10 is a side elevation sectional view taken along line 10—10 of FIG. 9.

After weeding, the graphic 68 is transferred to a transfer sheet 78, shown in FIGS. 9 and 10. The transfer sheet 78 includes a support sheet 80 and an adhesive layer 82. The transfer sheet is applied to the graphic 68 while it is still adhered to the release paper 66. The adhesive layer 82 of the transfer sheet 78 has a stronger adhesion to the graphic 68 than does the adhesive 64 of the starting material sheet 60. Thus, referring to FIGS. 11 and 12, when the transfer sheet 78 is removed from the starting material sheet 60, the graphic 68 remains adhered to the transfer sheet 78. The adhesive 64 remains on the graphic 68 to facilitate the attachment of the graphic 68 to a display or sign.

Figures 11, 12, 13, 14, 15, 16:
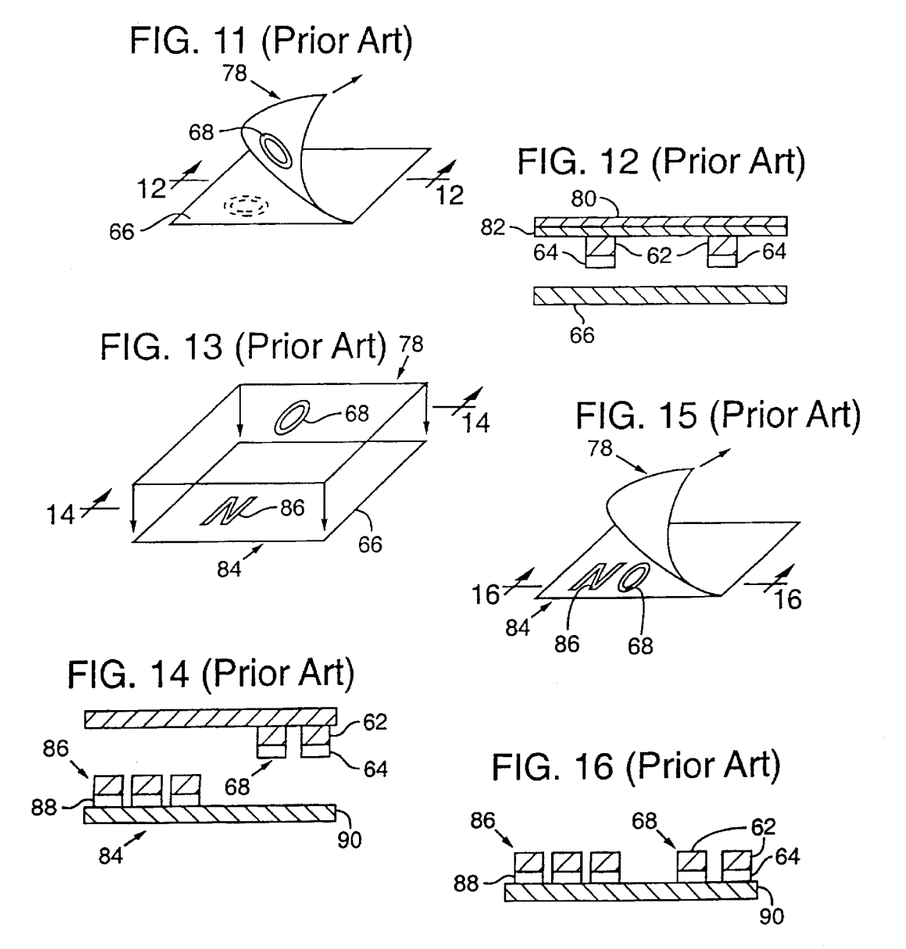
FIG. 11 is a perspective view of a prior art vinyl graphic after transfer onto a transfer sheet.
FIG. 12 is a side elevation sectional view taken along line 12—12 of FIG. 11.
FIG. 13 is a perspective view of a prior art vinyl graphic on a transfer sheet before being transferred to a substrate.
FIG. 14 is a side elevation sectional view taken along line 14—14 of FIG. 13.
FIG. 15 is a perspective view of a prior art vinyl graphic after transfer onto a substrate.
FIG. 16 is a side elevation sectional view taken along line 16—16 of FIG. 15.

Once the graphic is on the transfer sheet, it is ready to be applied to a display or sign. FIGS. 13–15 depict this process. FIG. 13 shows the letter "O" being applied to a sign 84 that already has the letter "N" affixed, shown at 86. Alternatively, the letters "ON" could be simultaneously applied, but the process permits them to be aligned with a preexisting background. The transfer paper is pressed to the sign surface 90 such that the graphic 68 is located at the collect position on the sign. The transfer paper 78 is then peeled away, leaving the graphic 68 on the sign surface 90.

Figure 17:
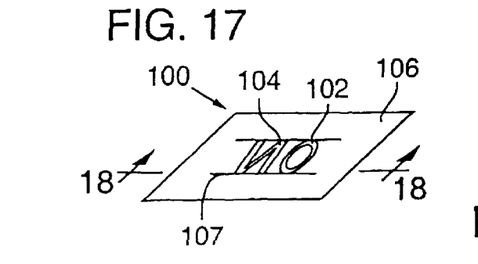
FIG. 17 is a perspective view of graphics printed on a release substrate according to an embodiment of the present invention.
Figure 18:
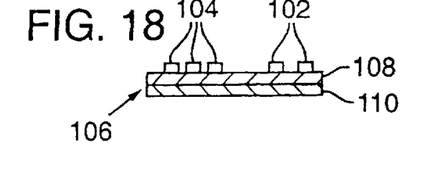
FIG. 18 is a side elevation sectional view taken along line 18—18 of FIG. 17.
Figure 19:
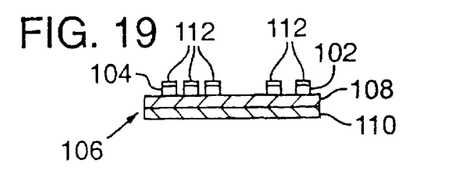
FIG. 19 is a side elevation sectional view of an adhesive applied to the graphics depicted in FIG. 18.
Figure 20:
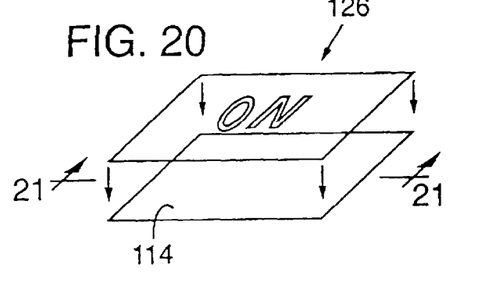
FIG. 20 is a perspective view of graphics with adhesives attached before transfer to a substrate.
Figure 21:
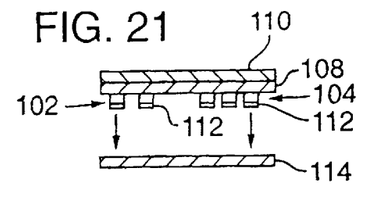
FIG. 21 is a side elevation sectional view taken along line 21—21 of FIG. 20.
Figure 22:
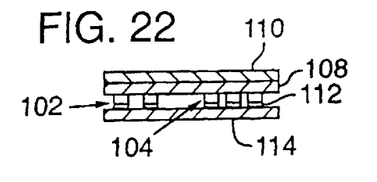
FIG. 22 is a side elevation sectional view of the graphics depicted in FIG. 21 after adhering the graphics to a substrate but before removing the release substrate.
Figure 23:
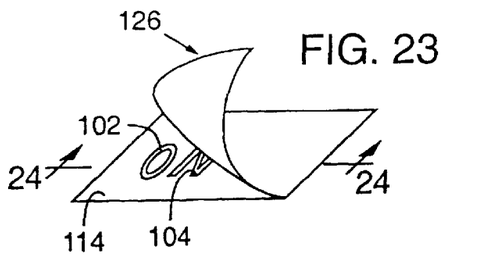
FIG. 23 is a perspective view of graphics on a substrate after transfer from the release substrate.
Figure 24:
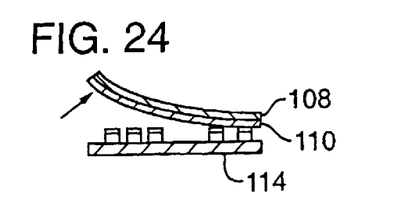
FIG. 24 is a side elevation sectional view taken along line 24—24 of FIG. 23.

The labor intensive and inefficient nature of the vinyl transfer process make it a less than ideal solution to the problem of graphics transfer in the display, advertising and sign industries. A better process of transferring graphics would include the use of an ink of the present invention in combination with the printing and reproduction techniques and apparatus described in U.S. Pat. No. 5,689,426 to Kemeny et al., which is incorporated by reference herein. In this process, depicted in FIGS. 17–24, the graphics to be transferred are first printed onto a release substrate 106 with an inkjet printer, and the ink is subsequently polymerized to make a film. FIG. 17 shows the letters "O" at 102 and "N" at 104 after they have been printed onto a release substrate and polymerized. The graphics are printed as a mirror image of how they are to appear on a sign or display, as the image will be reversed during the transfer process. The release substrate 106 onto which the graphics are printed includes a release coating 108 and a support sheet 10. The coating may be comprised of silicon, polyethylene, or other conventional release materials, and may be unnecessary if the support sheet 110 adheres only weakly to a polymerized ink film. The release substrate 106 may be opaque, but it normally would be at least somewhat transparent to facilitate alignment during the mounting process. It may also include faint lines 107 to further assist in this process (see FIG. 17). After the ink has been polymerized, an adhesive 112 is applied to the graphics 102 and 104, as shown in FIG. 19. The release sheet is then applied to a sign, display or other substrate 114 as shown in FIGS. 20–22. The adhesive 112 bonds the graphics 102 and 104 strongly to the surface of the substrate 114. The release substrate 106 is then peeled away as depicted in FIGS. 23 and 24, leaving the graphics 102 and 104 behind on the substrate surface 114. Transferring graphics according to this technique avoids the time consuming and wasteful weeding process. Moreover, if the inks of the present invention are used with this technique, one needs to keep only a few colors of inks in inventory, which can be mixed to provide an indefinite number of colors, rather than having to stock a large number of rolls of vinyl film starting material.

Accordingly, while the preferred compositions and methods of practicing the present invention have been described, other variations may be made without departing from the spirit of the invention.

It is claimed and desired to secure by Letters Patent:

1. A polymerizable printing ink, comprising:
  a polar suspending medium;
  a plurality of monodisperse polymer microspheres suspended in the suspending medium;
  a coloring agent chemically associated with the microspheres;
  a surfactant dispersed in the suspending medium to stabilize the microsphere suspension; and
  a monomer, including at least one unsaturated group, positioned in the ink such that polymerization of the monomer after applying the ink to a substrate secures the microspheres in a fixed relation to one another.

2. The ink of claim 1 wherein the polar suspending medium is 30–100% water and 0–70% a lower molecular weight alkyl alcohol by volume.

3. The ink of claim 2 wherein the lower molecular weight alkyl alcohol is selected from the group consisting of methanol, ethanol and isopropanol.

4. The ink of claim 1, further comprising an initiator to initiate the polymerization of the ink when the ink is exposed to some from of energy.

5. The ink of claim 4 wherein the initiator is a photoinitiator.

6. The ink of claim 5 wherein the photoinitiator has a concentration of 1–6% of the ink by weight.

7. The ink of claim 6 wherein the photoinitiator is selected from the group consisting of benzophenone derivatives, benzil derivatives, thioxanthones and diazonium derivatives.

8. The ink of claim 1 wherein the coloring agent is a pigment.

9. The ink of claim 8 wherein the pigment is selected from the group consisting of aceto-acetarylamides, diarylide yellows, diarylide orange, naphthol red, toluidine red, azo magenta G, PMTA deep green, phthalocyanine green, ultramarine blue, methyl violet, crystal violet, dioxazine violet B, carbon black, and titanium dioxide.

10. A The ink of claim 1 wherein the monomer is incorporated within the microspheres so that polymerization of the monomer chemically bonds the microspheres together to a substantial extent.

11. The ink of claim 1 wherein the monomer is dispersed in the suspending medium so that polymerization of the monomer physically traps the microspheres in a polymer matrix to a substantial extent.

12. The ink of claim 11 wherein the monomer has a concentration of 3–20% of the ink by weight.

13. The ink of claim 12 wherein the monomer is selected from the group consisting of butadiene, divinylbenzene, vinyltoluene, vinyl chloride, acrylate derivatives, amide derivatives, siloxanes, and cyanurates.

14. The ink of claim 1 wherein the microspheres have a diameter of approximately 0.5 microns or smaller.

15. The ink of claim 1 wherein the surfactant has a concentration of 0.2–2.0% of the ink by weight.

16. The ink of claim 15 wherein the surfactant is selected from the group consisting of anionic polyelectrolytes, unsaturated fatty acids, long chain carboxylic acids, long chain sulfates and sulfonates, and anionic/nonionic surfactant blends.

17. The ink of claim 1, further comprising a plasticizer to increase the flexibility of the ink after it is polymerized.

18. The ink of claim 17 wherein the plasticizer has a concentration of 0.2–3.0% of the ink by weight.

19. The ink of claim 18 wherein the plasticizer is selected from the group consisting of abietates, adipates, benzoates, butyrates, citrates, epoxidized compounds, phosphates, phthalates, polyesters, polyol esters, ricinoleates, sebacates, stearates, and sulfonamines.

20. The ink of claim 1, further comprising a wetting agent to reduce the surface tension of the ink.

21. The ink of claim 20 wherein the wetting agent has a concentration of 0.05–2.0% of the ink by weight.

22. The ink of claim 21 wherein the wetting agent is selected from the group consisting of polyethylene glycol fatty acid esters, nonyl phenol ethylene oxide, polypropoxy quanternary ammonium acetate and fluorinated hydrocarbons.

23. The ink of claim 1, further comprising an inhibitor to increase the shelf life of the ink.

24. The ink of claim 23 wherein the inhibitor is selected from the group consisting of hydroquinone, p-methoxyphenol, beta-napthol, tert-butyl catechol, pyrogallol and benzotriazoles.

25. The ink of claim 23 wherein the inhibitor is an antioxidant.

26. The ink of claim 25 wherein the antioxidant has a concentration of 0.05 to 0.5% of the ink by weight.

27. The ink of claim 26 wherein the antioxidant is selected from the group consisting of naphthols, substituted phenols, oximes, and aromatic amines.

28. A photopolymerizable printable ink for use with inkjet printers, comprising:

an aqueous suspending medium including at least 30% water and 0–70% a lower molecular weight alkyl alcohol by volume;

a plurality of monodisperse polymer microspheres dispersed in the suspending medium at a concentration of 10–40% of the ink by weight;

a coloring agent associated with the microspheres;

a monomer with at least one unsaturated group dispersed in the suspending medium at a concentration of 0–10% of the ink by weight;

a photoinitiator dispersed in the suspending medium at a concentration of 0–3.0% of the ink by weight;

a plasticizer dispersed in the suspending medium at a concentration of 0–3.0% of the ink by weight;

a wetting agent dispersed in the suspending medium at a concentration of 0–2.0% of the ink by weight;

an antioxidant dispersed in the suspending medium at a concentration of 0–5.0% of the ink by weight;

a flame retardant dispersed in the suspending medium at a concentration of 0–1.0% of the ink by weight;

a thixotropic agent dispersed in the suspending medium at a concentration of 0–1.0% of the ink by weight; and an accelerator dispersed in the suspending medium.

29. A method of making a polymerizable printing ink for printing a colored film on a substrate, the ink including a suspending medium that is at least partially aqueous, the method comprising the steps of:

mixing at least one surfactant into the suspending medium;

forming a plurality of monodispersed polymer microspheres so that the microspheres have at least some unreacted monomer associated therewith;

adding a coloring agent to the microspheres so that the coloring agent becomes incorporated within the microspheres to form a plurality of microsphere-coloring agent complexes; and mixing the microsphere-coloring agent complexes into the suspending medium.

30. The method of claim 29, further comprising mixing an initiator into the suspending medium before mixing the microsphere-coloring agent complexes into the suspending medium.

31. The method of claim 30 wherein the step of mixing an initiator into the suspending medium includes mixing a photoinitiator into the suspending medium.

32. The method of claim 29, further comprising mixing a monomer with at least one unsaturated group into the suspending medium before mixing the microsphere-coloring agent complexes into the suspending medium to provide an additional source of unreacted monomer for the subsequent polymerization of the ink.

33. The method of claim 29 wherein the step of adding a coloring agent to the microspheres includes adding a pigment to the microspheres.

34. The ink of claim 1 wherein the coloring agent is a dye.

35. The ink of claim 34 wherein the dye is a hydrophobic dye.

36. The ink of claim 35 wherein the hydrophobic dye is selected from the group consisting of Cl solvent Yellow 19 No. 13900:1, Cl solvent Orange 4S No. 11700:1, Cl Solvent Red 8 No. 12715, Victoria Blue, methyl violet and nigrosine.

* * * * *